(12) United States Patent
Wilfert et al.

(10) Patent No.: US 11,834,355 B2
(45) Date of Patent: Dec. 5, 2023

(54) METHOD AND SYSTEM FOR PHOSPHATE RECOVERY FROM A STREAM

(71) Applicant: Stichting Wetsus, European Centre of Excellence for Sustainable Water Technology, Leeuwarden (NL)

(72) Inventors: Philipp Karl Wilfert, Leeuwarden (NL); Leendert Date Korving, Leeuwarden (NL); Peter Carlo Rem, Leeuwarden (NL); Geert-Jan Witkamp, Leeuwarden (NL); Marinus Cornelis Maria Van Loosdrecht, Leeuwarden (NL); Achim Lulian Dugulan, Leeuwarden (NL); Kees Goubitz, Leeuwarden (NL); Simon Peter Maria Berkhout, Leeuwarden (NL)

(73) Assignee: Kemira Oyj, Helsinki (FI)

( * ) Notice: Subject to any disclaimer, the term of this patent is extended or adjusted under 35 U.S.C. 154(b) by 438 days.

(21) Appl. No.: 16/493,672

(22) PCT Filed: Mar. 14, 2018

(86) PCT No.: PCT/NL2018/050159
§ 371 (c)(1),
(2) Date: Sep. 12, 2019

(87) PCT Pub. No.: WO2018/169395
PCT Pub. Date: Sep. 20, 2018

(65) Prior Publication Data
US 2020/0010342 A1    Jan. 9, 2020

(30) Foreign Application Priority Data

Mar. 15, 2017    (NL) ..................... 2018525

(51) Int. Cl.
*C02F 1/52*   (2023.01)
*C01G 49/10*  (2006.01)
(Continued)

(52) U.S. Cl.
CPC .......... *C02F 1/5245* (2013.01); *C01B 25/306* (2013.01); *C01G 49/10* (2013.01);
(Continued)

(58) Field of Classification Search
CPC ........ C02F 3/28; C02F 1/5245; C01B 25/306; C01G 49/10
(Continued)

(56) References Cited

U.S. PATENT DOCUMENTS

| | | | |
|---|---|---|---|
| 5,888,404 A | 3/1999 | Jokinen | |
| 8,568,590 B2 * | 10/2013 | Barak | C02F 1/5236 210/603 |

FOREIGN PATENT DOCUMENTS

| | | |
|---|---|---|
| CA | 2252656 | 5/1999 |
| CN | 104445555 | 3/2015 |

(Continued)

*Primary Examiner* — Melissa S Swain
(74) *Attorney, Agent, or Firm* — Marcus C. Dawes (57) ABSTRACT

The invention relates to a method and system for phosphate recovery from a stream such as waste flow, sewage or another sludge stream. The method comprises the steps of: providing an incoming stream comprising an initial amount of phosphate; dosing/controlling iron salt to the stream such that precipitates are formed in the stream, wherein the precipitates comprise vivianite like structures comprising more than 60% of the initial amount of phosphate in the incoming stream, and preferably also the steps of: separating the vivianite like structures from the stream; and recovering the phosphates from the separated vivianite like structures.

19 Claims, 4 Drawing Sheets

(51) Int. Cl.
    *C01B 25/30*     (2006.01)
    *C02F 1/48*     (2023.01)
    *C02F 3/28*     (2023.01)
    *C02F 1/00*     (2023.01)
    *C02F 101/10*     (2006.01)

(52) U.S. Cl.
    CPC ............ *C02F 1/481* (2013.01); *C02F 1/5209* (2013.01); *C02F 3/28* (2013.01); *C02F 2001/007* (2013.01); *C02F 2101/105* (2013.01); *C02F 2209/18* (2013.01)

(58) Field of Classification Search
    USPC ........................................................ 423/307
    See application file for complete search history.

(56) References Cited

FOREIGN PATENT DOCUMENTS

| | | | |
|---|---|---|---|
| EP | 2666759 | 11/2013 | |
| WO | WO-2007048210 A1 * | 5/2007 | ......... C22B 34/1209 |

\* cited by examiner

METHOD AND SYSTEM FOR PHOSPHATE RECOVERY FROM A STREAM

The invention relates to a method for recovery of phosphate from a (wet) stream, such as a waste flow. For example, the method recovers phosphate from sewage or another sludge stream, and/or manure.

It is known from practice to remove phosphorus from waste water to prevent eutrophication in effluent receiving surface waters. Conventional techniques include enhanced biological phosphorus removal (EBPR) and chemical phosphorus removal (CPR).

Conventional phosphorus recovery from waste water involves the production of struvite in EBPR plants and/or phosphorus recovery from sludge ash. It is known that struvite precipitation enables recovery of phosphorus. However, the efficiency to recover phosphorus as struvite is typically only in the range of 10-50% of the total influent phosphorus load. Also, struvite precipitation is limited to plants using EBPR. Incineration involving recovery of phosphorus from sludge ash is relatively expensive. Also, sludge can be applied to agricultural land. However, there are areas with agricultural land that have a surplus of phosphorus due to manure surpluses. Also, the elemental composition of sludge/manure may not match with crop demand.

An objective of the present invention is to provide a method for phosphate/phosphorus recovery from a stream that obviates or at least reduces the aforementioned problems and is more effective and/or more efficient as compared to conventional methods.

This object is achieved with the method for phosphate/phosphorus recovery from a stream such as waste flow, sewage or another sludge stream according to the present invention, wherein the method comprises the steps of:
  providing an incoming stream comprising an initial amount of phosphate; and
  dosing and/or controlling iron salt to the stream such that precipitates are formed in the stream, wherein the precipitates comprise vivianite like structures comprising more than 60% of the initial amount of phosphate in the incoming stream.

Streams may comprise phosphate ($PO_4$) that is the main molecule in the relevant streams that comprises the element Phosphorus (P). These streams relate to (wet) waste water flows, sewage, manure or other streams. For example, in an embodiment of the invention a waste water treatment plant contains activated sludge which is contacted with the incoming sewage (after first removing particles by means of a primary clarifier). The sludge, mainly comprising microbial biomass, grows from the aerobic oxidation of the dissolved or colloidal organics in the sewage. To remove phosphate from the solution an iron-salt is added to the activated sludge and sewage mixture. The formed precipitate will be part of the sludge. Preferably, the sludge is retained in the waste water treatment plant by means of a secondary clarifier-settler. The supernatant of this clarifier is the treated water and the settled activated sludge is returned to the aerated tank. Because of biomass growth and accumulation of inorganics, some of the settled sludge needs to be disposed of. This is the waste activated sludge. This waste activated sludge is anaerobically digested to reduce the volume and recovery energy in the form of biogas. During this anaerobic digestion vivianite is formed (partly due to the reduction of Fe(III) to Fe(II)). It was shown that the fraction of the phosphate present as vivianite, after digestion, depends on the molar ratio between iron and phosphate in the waste activated sludge, and thus on the amount of iron that was added in the activated sludge plant prior to anaerobic digestion. The digested sludge is preferably fed into a magnetic separator to separate the magnetic vivianite-like structures from the rest of the digested sludge (largely organics). It was shown that this enables recovery of phosphate.

Dosing and/or controlling iron salt to the stream enables forming of precipitates in the stream. More specifically, dosing iron salts to the stream enables forming of vivianite (which is a Fe(II) phosphate mineral: $Fe_3$ (II) $[PO_4]_2.8H_2O$) or vivianite like structures. Vivianite like structures includes pure vivianite and also structures including some impurities like magnesium or calcium.

Dosing and/or controlling is to adjust and/or measure and/or determining the amount of iron salt, where the amount of iron salt is in the range of 0 M to a saturated solution, preferably maintaining a specific ratio. For example one which will be described later.

In a presently preferred embodiment of the invention phosphate is removed from waste water in sewage treatment plants. In experiments it is seen that often a mixture of Fe (III) phosphate precipitates and vivianite like structures is formed. After the preferred anaerobic/anoxic digestion step (for example for biogas production during manure/sewage treatment) all Fe(III) transforms into Fe(II) and vivianite like structures can form. In the mentioned experiments these vivianite like structures are effectively formed when oxygen is absent and bacteria are active. Also without this anaerobic/anoxic step vivianite formation may occur. However, in the mentioned experiments it was shown that in a preferred embodiment of the invention the vivianite formation is favoured during anaerobic/anoxic digestion.

The vivianity like structures may constitute a valuable phosphorus source as such. Optionally, the structures are further treated to recover the phosphates from the structures. According to the invention the method further comprises the steps of:
  separating the vivianite like structures from the stream; and
  recovering the phosphates from the separated vivianite like structures.

According to the invention the phosphate recovery is achieved effectively as more than 60% (and up to 90%) of the initial amount of phosphate in the incoming stream is incorporated into the vivianite like structures. This enables an effective removal of phosphorus from the stream. In accordance to the method of the invention this removal is achieved by separating the vivianite like structures from the stream. This separation of the vivianite like structures enables removal of the phosphates from the stream. As a further effect this (indirectly) obviates or at least reduces the problem associated with eutrophication of effluent receiving surface waters due to the iron dosing. In other words, the higher Fe dosage (than normal) may also help to lower phosphate concentrations in the effluent of sewage treatment plants As a next step in the method for phosphate recovery according to the invention the phosphates are recovered from the separated vivianite like structures. This enables recycling of phosphorus. Furthermore, recovery of phosphorus is desired due to the limited availability of phosphorus such that a waste water flow may act as a secondary source of phosphorus, for example. This renders streams such as waste streams, sewage and manure, as an alternative source of phosphorus. This also allows for a circular use of phosphate which is an important component of fertilizers. This improves the sustainability of the global food production that involves phosphorus as an essential nutrient.

Furthermore, by "capturing" more than 60%, preferably up to about 90% or more, of the amount of phosphate into the vivianite like structures an improved removal rate and/or recovery rate is achieved as compared to alternative conventional methods, including struvite precipitation. It is suggested that in the presence of iron vivianite, including its structures, preferably forms over other inorganic phosphate phases. More particularly, in the presence of sufficient iron the forming of vivianite like structures is limited by the organic phosphate and sulphide in the stream. The vivianite like structures that are formed are substantially formed as crystals and/or aggregates with a size substantially in the range of 10-100 μm. Depending on the initial stream and components therein the purity of the vivianite like structures can be relatively high thereby enabling application of the structures in different processes. In the presently preferred embodiment the phosphates are recovered from the separated vivianite like structures to enable use for a fertilizer production, for example. Optionally, the vivianite like structures can be used as colour pigment, and in the production of lithium iron batteries, for example.

Optionally, in addition or as an alternative, the separated vivianite particles (or synthetically produced vivianite) could also be recycled in the waste stream to allow further growth. In such a way formed (larger) vivianite particles could be separated more easily from the wastewater, for example using a separator such as an (electro)magnetic separator. This "growing" process is also referred to as seeding. In addition, other possibilities could be envisaged, such as the possibility to produce food grade phosphoric acid out of the vivianite.

The improved removal and recovery rates of phosphates from a stream, such as a sewage sludge, obviates or at least reduces the need for incineration of the sludge enabling recovery of phosphates and the capital investments that are associated therewith. Furthermore, the method according to the present invention does not rely on the immense use of chemicals as compared to some of the conventional processes. More particularly, the vivianite like structures are separated from the stream and the resulting concentrated stream can be subjected to a post treatment that may involve a dedicated chemical treatment. This treatment enables circular use of the iron. Also in such case a significant reduction of the use of chemicals is achieved.

In a presently preferred embodiment of the invention the vivianite like structures comprise more than 70%, preferably more than 80%, and most preferably about 90% or even more, of the initial amount of phosphate of the incoming stream. This further improves the efficiency of the removal and/or recovery of phosphate from a stream. Measurements with the method according to the invention even show that more than 80%, such as about 90%, of the total amount of phosphate in a sewage sludge is bound in vivianite. This significantly improves the recovery efficiencies of phosphate as compared to traditional struvite technologies, for example.

Iron salts are also referred to as Fe (II)/FE (III) salts. Preferably, the iron salts that are added to the stream comprise one or more of iron chloride and iron sulphate. Experiments showed that the use of these specific iron salts achieves an efficient removal and/or recovery by effectively forming of the desired precipitates in the stream.

In a presently preferred embodiment of the invention the step of dosing iron salt to the stream comprises adding an amount of iron with a molar ratio of iron to phosphorus of at least 1.3, preferably at least 1.5.

By dosing iron salt in accordance to the preferred molar ratio the phosphate in the incoming stream is effectively included in the vivianite like structures. The iron chloride may include ferric and/or ferrous chloride. The presently preferred range is from 1.3 to 1.9, with the actual value more preferably being about 1.5.

Optionally, some additional iron salt is added to the stream to bind sulphide in the incoming stream before actually binding the phosphate in the stream. Preferably, the amount of sulphide and/or phosphate is known to improve the effective dosing of iron salts and to prevent underdosing and/or overdosing. This may further improve the efficiency of the phosphate removal and/or phosphate recovery. Especially the relatively high amount of dosed iron salts as compared to conventional treatment plants enables not only removal of phosphate it also enables effective recovery of phosphate.

More specifically, in a presently preferred embodiment, the dosing of iron salt is controlled by a (dosing) controller in response to a measurement of the initial amount of phosphate in the incoming stream. As already mentioned, by measuring the amount of phosphate in the incoming stream a dedicated dosing of the iron salt to the stream can be achieved. This prevents underdosing and/or overdosing thereby improving the overall efficiency. It will be understood that, in addition or as an alternative, also other measurements could be envisaged, such as measuring after an anaerobic stage.

As an example, after a presently preferred anaerobic stage, total iron (Fe) and total phosphorus (P) can be measured. Then, in response to the measurement(s), the iron dosing is adjusted to reach the desired Fe:P ratio in the sludge that was mentioned earlier for optimal P recovery. This optimal ratio is preferably somewhere between 1.3 and 1.9. In (commercial) applications this could be monitored about once/week or other time intervals. In practice, it could be that the amount of organic phosphorus is for some reason extraordinary high. This may limit vivianite formation, because organic phosphorus is not available for vivianite formation and/or that sulphide is occurring in high concentrations (which would require further iron overdosing because after substantially all sulphide has reacted to iron sulphide the formation of vivianite starts at an effective rate). Therefore, under these circumstances an evaluation/measurement of the presence of organic phosphorus and sulphide during the anaerobic stage may further improve the removal/recovery.

In a presently preferred embodiment of the invention separating the vivianite like structures from the stream comprises magnetic separating of the structures with a magnetic and/or electromagnetic separator.

The use of a magnetic and/or electromagnetic separator achieves an efficient and effective separation of the vivianite like structures from the stream. Such separator may involve a channel around which the magnets or electromagnets are provided that attract the vivianite like structures, while other non-magnetic material continues to travel through the channel such that the magnetically separated material is separated from the non-magnetic material. Optionally, this may include the use of profiled plates, walls or surfaces, as are known components of high-gradient magnetic separators, such as the Jones separator, for example. This enables an effective and efficient separation of the magnetic vivianite like structures from the stream.

Alternatively, or in addition thereto, vivianite like structures are separated from the stream with a gravity separator that separates heavy materials with a high density from light materials with a low density.

Using the density difference between the vivianite like structures and the other components in the stream enables an effective separation of vivianite like structures. Such gravity separator may relate to a (hydro)cyclone, for example.

In a further preferred embodiment of the invention, the step of recovering the phosphates, and possibly the iron, from the separated vivianite like structures comprises treating the vivianite like structures to produce iron oxide precipitates.

In a further preferred embodiment of the invention, the vivianite-like particles are concentrated from the stream by magnetic separation and/or gravity separation following a process step that frees (liberates) the vivianite-like particles from organic particles, such as fibers, that stick to the vivianite-like particles or entangle them. In general, intense shear of the liquid phase by high-speed rotors or jets will promote liberation of particles of different types that are embedded in the liquid. Liberation of the vivianite-like particles from organic particles, in turn, will promote the effectiveness of subsequent magnetic and/or gravity separation.

By forming iron oxide precipitates from the vivianite like structures the phosphates can be recovered effectively. Preferably, treating the vivianite like structures involves performing an alkaline treatment. This alkaline treatment may involve the use of sodium hydroxide (caustic soda, potassium hydroxide (caustic potash).

In a presently preferred embodiment the alkaline treatment involves adding potassium hydroxide that enables production of a potassium phosphate solution. Such recovery of phosphate involving the alkaline treatment enables an effective recovery that enables effective re-use of the phosphate and potassium in the potassium phosphate solution that can be applied as a fertilizer, for example.

In a further preferred embodiment of the invention the method further comprises the step of treating the iron oxide with hydrochloric acid to produce iron chloride.

By performing a further treatment step the produced iron oxide may react with the hydrochloric acid to produce the iron chloride. Preferably, this production of iron chloride enables a recycling step of the resulting iron chloride to the dosing step of iron salt to the stream. This improves the overall efficiency of the method for phosphate recovery by recycling the iron in the method. Also, the iron oxide can be used as such in other (existing) processes, for instance as an alternative to iron ore.

In a presently preferred embodiment the incoming stream is a flow to an anaerobic treatment system, such as a digester. Such combination of process steps improves the overall process efficiency.

In a presently preferred embodiment the iron is added to the sludge in the reactor and reacts to form vivianite in the digester. The advantage is that this will allow to start with sludge containing a low concentration of recoverable material.

In a presently preferred embodiment the stream as such exist of sewage sludge and/or industrial sludge and/or any other type of sludge. The advantage of this process is that it is not limited to a specific type of sludge. This improves the overall process efficiency.

In a presently preferred embodiment the pH of the stream as such is in the range of 6-10, preferably in the range of 6-9, more preferably in the range of 7-8. The advantage of a broad pH rang is that the stream as such does not need to be pre-treated. The effect is that fewer chemicals are required and that the overall process improves in efficiency. Surprisingly the method performs above expectations in the pH range of 7-8.

The invention also relates to a system for phosphate recovery from a stream, the system being capable of performing the method in one or more of the embodiments according the invention, wherein the system comprising:
 a reactor comprising:
  an inlet for an incoming stream comprising an initial amount of phosphate;
  an iron salt dosing device configured for dosing iron salt in the reactor such that precipitates are formed in the stream, wherein the precipitates comprise vivianite like structures comprising more than 60% of the initial amount of phosphate in the incoming stream; and
  an outlet.

The system provides the same effects and advantages as those described for the method. Preferably the system further comprises:
 a separator for separating the vivianite like structures from the stream; and
 a treatment system for treating the vivianite like structures to produce iron oxide precipitates.

More specifically, the system enables an efficient and effective phosphate recovery from a stream involving a separator, such as a magnetic/electromagnetic separator and/or a gravity separator. The treatment system may enable performing different treatment steps, preferably including the alkaline treatment.

In a presently preferred embodiment the system further comprises a dosing controller and a phosphate measurement system that are configured to control dosing of iron salt in response to a measurement of the initial amount of phosphate in the incoming stream, for example. This further improves the overall efficiency of the iron salt dosing preventing underdosing and/or overdosing of iron into the stream. Optionally, in addition or as an alternative, also the amount of sulphide can be measured to further improve the dosing. As mentioned earlier, also other measurements can be envisaged in accordance with the present invention.

As was mentioned earlier, alternatively and/or in addition to the sulphide measurement, total iron (Fe) and total phosphorus (P) can be measured.

Further advantages, features and details of the invention are elucidated on the basis of preferred embodiments thereof, wherein reference is made to the accompanying drawings, in which.

Figure 1:
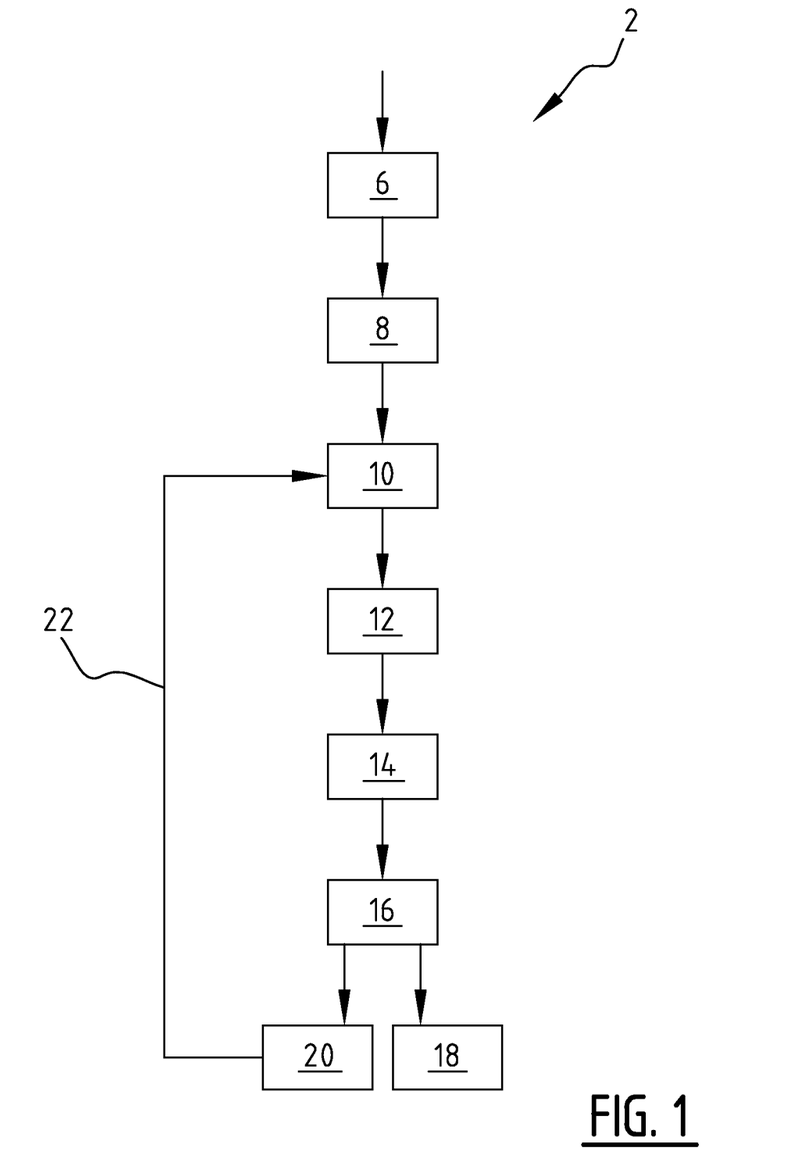
FIG. 1 shows the method according to the present invention.

Process 2 (FIG. 1) starts with supply of stream 4 that comprises an amount of phosphate. In the illustrated embodiment measurement step 6 measures the amount of phosphate and/or sulphide. Calculation step 8 determines the optimal amount of iron or iron salt to be dosed into the stream. In dosing step 10 iron is added to the stream to enable forming 12 of precipitates comprising vivianite like structures. In separation step 14 the vivianite like structure is separated and removed from the stream. The vivianite like structures undergo a post treatment to recover the phosphorus components, such as an alkaline treatment 16. For example, this treatment may provide a potassium phosphate solution that can be used 18 as fertilizer. The iron oxide precipitates can be treated 20 with hydrochloric acid resulting in recycle iron stream 22 that can be used in dosing step 10. Recycle stream 22 may even obviate the need for external iron or at least significantly reduce this need.

Recovery system 24 (FIG. 2) comprises reactor 26 that receives incoming stream 4. In the illustrated embodiment in reactor 26 anaerobic/anoxic conditions are maintained. From reactor 26 flow 28 is directed towards separator 30. Sludge/waste 32 leaves system 24.

Figure 2:
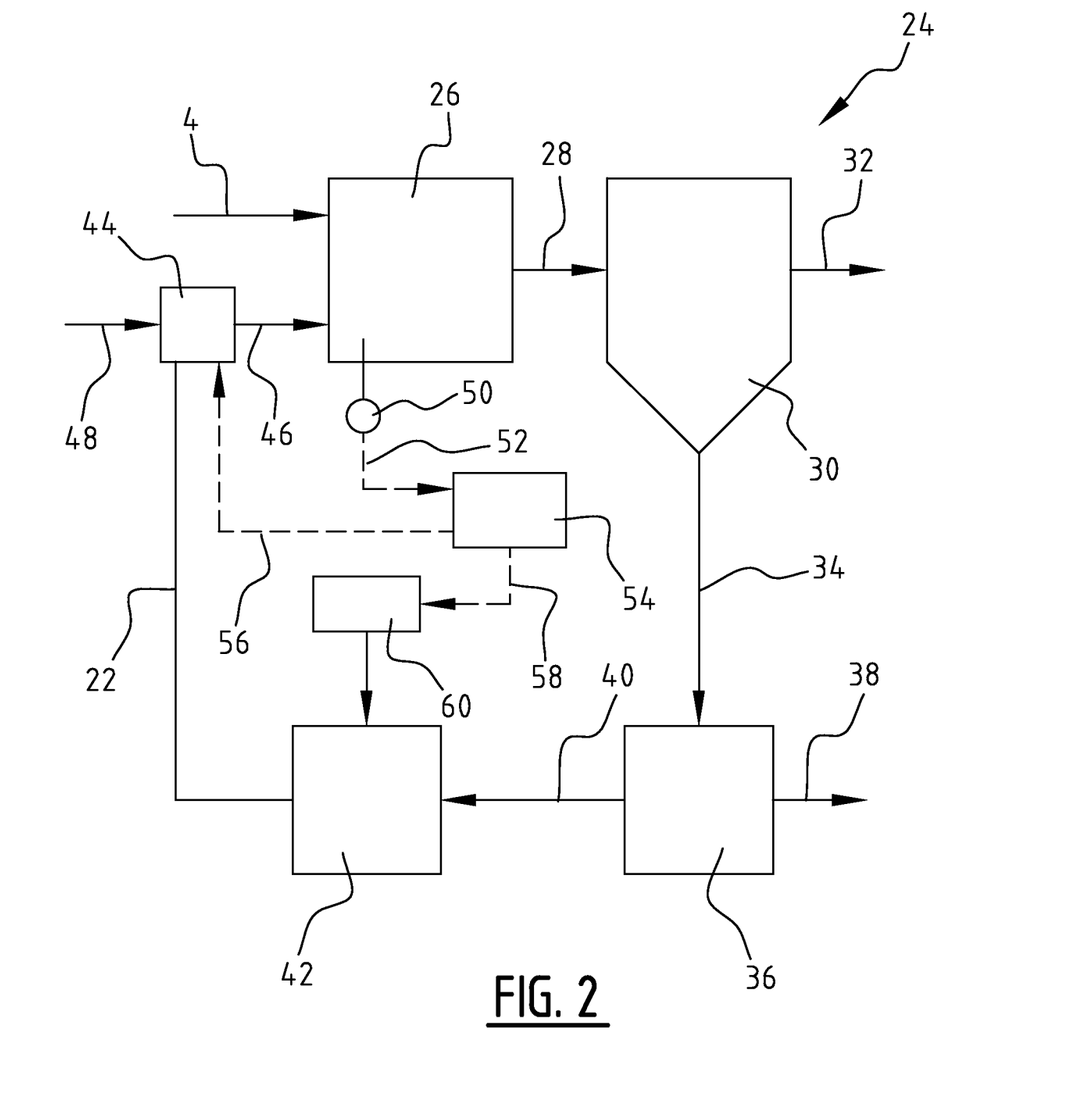
FIG. 2 shows an embodiment of the system capable of performing the method of FIG. 1.

In the illustrated embodiment the resulting vivianite like structures 34 are provided to alkaline reactor 36 to enable posttreatment, or vivianite like structures 34 are directly applied. The recovered phosphate, for example in the form of potassium phosphate, leaves reactor 36 in flow 38 and can be used as fertilizer, for example. The iron oxide leaves reactor 36 as flow 40 and can be treated in acid reactor 42, or can be used as such. This treatment enables a recycling flow 22 of iron salt that provides iron to dosing device 44 enabling dosing stream 46 to reactor 26. Therefore, dosing device 44 receives iron or iron salts from recycle flow 22 and from external incoming flow 48.

In one of the preferred embodiments the desired ratio is determined, the actual concentrations are measured and the desired dosage is calculated in order to dose the required and optimal amount of the iron salt to maintain and/or achieve the preferred ratio.

In the illustrated embodiment sensor 50 measures the composition of the stream in reactor 26, for example the amount of phosphate. Measurement signal 52 is provided to controller 54 that determines control setting(s) 56 of dosing device 44. This may involve periodic sampling of the sludge, for example weekly, and analysing the sample. It will be understood that also other components can be measured with one or more of sensors 50, such as the amount of sulphide that is preferably measured in a digester. Preferably, controller 54 also provides control settings 58 to acid dosing device 60 that provides acid, such as hydrochloric acid, to acid reactor 42.

In a sewage treatment plant reactor 26 comprises a receiving reactor (a sewage treatment plant, a waste water treatment plant) that receives the phosphate rich influent. Preferably, phosphate poor effluent leaves the system through an exit (not shown). The phosphate rich effluent 28 is provided to an anaerobic digester that in the illustrated embodiment is part of reactor 26. Iron is optionally added to the receiving reactor and/or the anaerobic digester.

It will be understood that other configurations implementing the present invention could also be envisaged in accordance to the invention. For example, as mentioned, iron may be added before the anaerobic stage to reach the preferred Fe:P range to further reduce the downflow Phosphorus level(s).

Separator 30 (FIG. 3) comprises frame or housing 62 that is preferable made of steel or another magnetisable material for guiding the magnetic flux, first magnet 64 and, advantageously, second magnet 66. Magnets 64, 66, are provided at a distance wherein assembly 68 is provided. Assembly 68 comprises first (magnetisable) plate 70 and second plate 72 that in the illustrated embodiment are provided with profile 74. In the illustrated embodiment the serrated profile 74 has a height H of about 1-2 mm and a width W of about 3-4 mm. Plates 70, 72 are provided at distance D in the range of 0.1-1 mm, preferably in the range of 0.2-0.4 mm. It will be understood that another configuration for separator 30 and/or other separator techniques can be applied in accordance with the invention.

The method according to the invention is applied to difference incoming streams with different characteristics/composition. In the experiments the sludge remains under anaerobic or anoxic conditions for several days, for example for about 20-30 days. The amount of vivianite like structures has been determined by MOssbauer Spectroscopy and semi quantitative XRD measurements. The table illustrates that the vivianite bound phosphorus increases with the molar Fe:P in the sludge. For example, a molar ratio of about 1.11 results in more than 60% of the incoming phosphorus being bound in vivianite, while higher percentages of above 80% are measured at higher ratio's. This indicates an effective and efficient removal/recovery of phosphorus from a stream. Results are shown in table 1. Table 1 shows that the fraction of the phosphate present as vivianite, after digestion, depends on the molar ratio between iron and phosphate in the waste activated sludge, and thus on the amount of iron that was added in the activated sludge plant prior to anaerobic digestion. The digested sludge was then fed into a magnetic separator to separate the magnetic vivianite-like structures from the rest of the digested sludge (largely organics). Table 3 and 4 show the fraction of phosphate recovered by the magnetic separation versus the total amount of phosphate in the digested sewage sludge.

TABLE 1

Percentage of phosphate present as vivianite or vivianite-like structures in digested waste activated sludge with different Fe:P ratio

| Sample reference | Molar ratio Fe:P | XRD-measurement (%) | Mössbauer-measurement (%) |
|---|---|---|---|
| Sludge sample 1 | 0.14 | 0 | |
| Sludge sample 2 | 0.50 | 15.3 | 13 |
| Sludge sample 3 | 0.82 | 49.7 | 30 |
| Sludge sample 4 | 1.11 | 63.7 | |
| Sludge sample 5 | 1.62 | 82.1 | |
| Sludge sample 6 | 1.57 | 83.6 | 61 |
| Sludge sample 7 | 2.36 | 102.3 | 89 |

The table indicates that according to Mossbauer (at 300 K), for the highest Fe:P ratio of 2.36, a significant amount of P is bound in vivianite.

Figure 3:
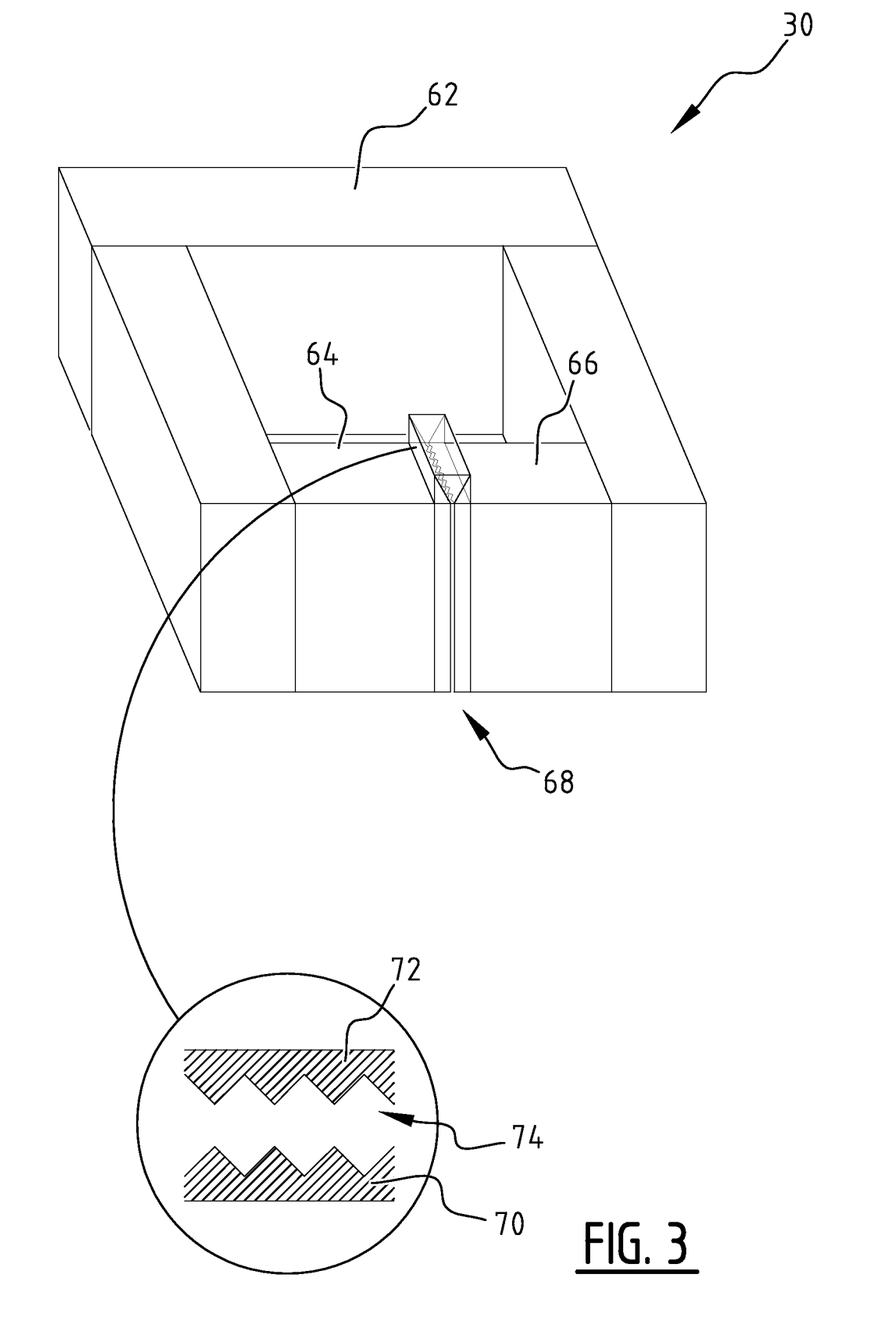
FIG. 3 shows a magnetic separator that can be used in the system of FIG. 2.
Figure 4:
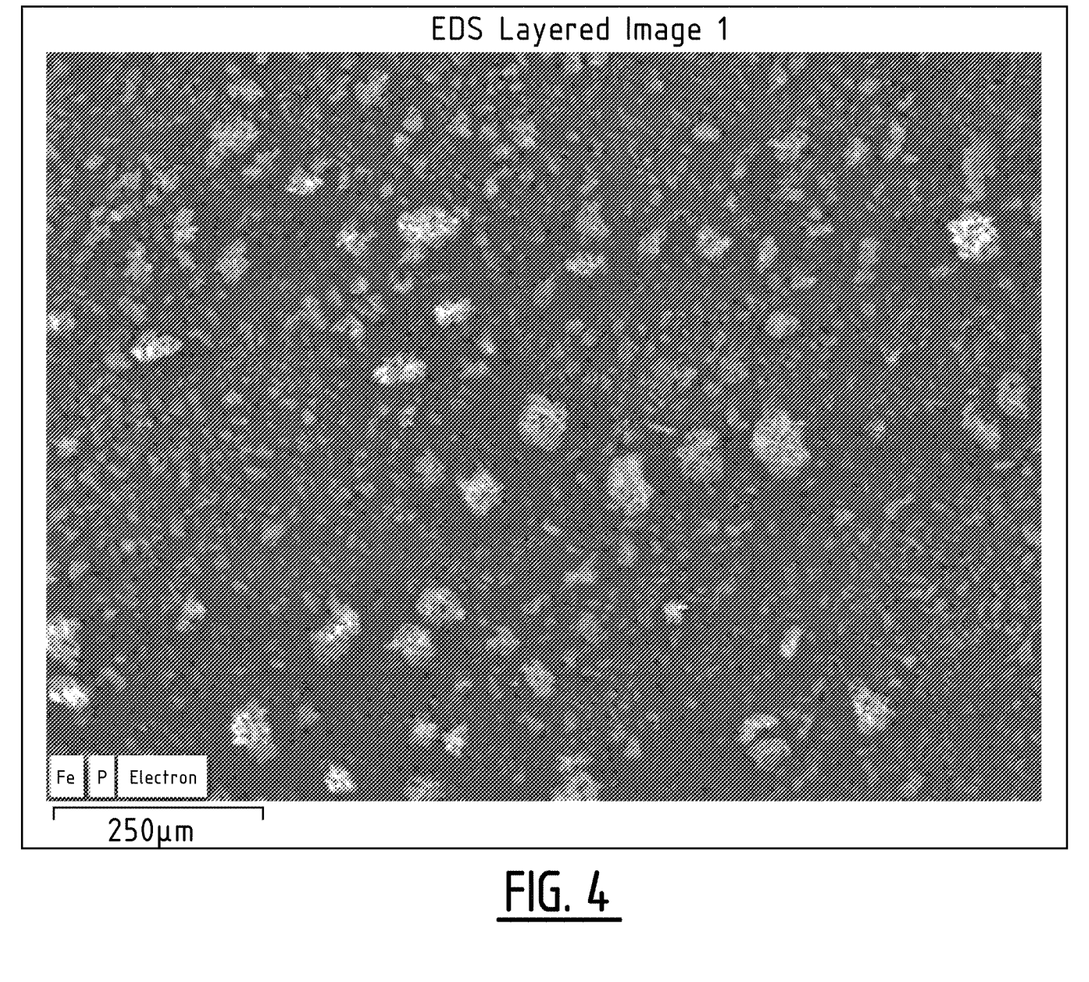
FIG. 4 shows vivianite with a SEM-EDX.

In a further experimental setup, the vivianite like structures are separated by a separator (FIG. 3). This separator has six channels with a radius of about 1.3 mm and a length of 40 mm with a cavity volume of about 0.41 cm$^3$. The stream has a viscosity of about 0.003 Pa·s, an estimated vivianite susceptibility of $1.0 \cdot 10^{-7}$ m$^3$/kg, and a vivianite density of about 2300 kg/m$^3$. During the separation the magnetic field intensity in the cavity was about $1 \cdot 10^{+06}$ A/m with a field gradient of about 500 T/m. Particles are subjected to two competing forces, a friction force as a result of the magnetic force that pushes/attracts the vivianite like structure towards the wall of the channel, and a drag force produced by the stream. Non-magnetic particles will only feel the drag force and are flushed out of the cavity. On the other hand, vivianite-like particles, which are magnetic, will resist the drag and stick to the walls. The vivianite-like particles that are thus collected are flushed from the cavity at a later stage. A number of measurements and calculations were performed for different settings. Results are shown in table 2.

TABLE 2

Effect of flow rate and cavity size on drag and magnetic stick forces for digested waste activated sludge passing a magnetic separator (e.g. FIG. 3)

| Liquidhead [mm] | Pressure [Pa] | Flowspeed in channel Central [mm/s] | Average | Reynolds number [—] | Total flow [cm³/s] | Drag + gravity force on particles near wall At 10 micron [N] | At 20 micron [N] |
|---|---|---|---|---|---|---|---|
| 0.5 | 5 | 18 | 9 | 3.81 | 0.09 | 4.50E−11 | 2.07E−10 |
| 1 | 10 | 35 | 18 | 7.63 | 0.18 | 8.33E−11 | 3.60E−10 |
| 1.5 | 15 | 53 | 26 | 11.44 | 0.27 | 1.22E−10 | 5.13E−10 |
| 2 | 20 | 70 | 35 | 15.26 | 0.36 | 1.60E−10 | 6.66E−10 |
| 2.5 | 25 | 88 | 44 | 19.07 | 0.45 | 1.98E−10 | 8.19E−10 |
| 3 | 30 | 106 | 53 | 22.89 | 0.54 | 2.36E−10 | 9.72E−10 |

| Drag + gravity force on particles near wall At 30 micron [N] | Magnetic stick force on wall | | | Ratio of drag and stick | | |
|---|---|---|---|---|---|---|
| | At 10 micron [N] | At 20 micron [N] | At 30 micron [N] | At 10 micron | At 20 micron | At 30 micron |
| 5.25E−10 | 3.01E−11 | 2.41E−10 | 8.13E−10 | 1.49 | 0.86 | 0.65 |
| 8.69E−10 | 3.01E−11 | 2.41E−10 | 8.13E−10 | 2.77 | 1.49 | 1.07 |
| 1.21E−09 | 3.01E−11 | 2.41E−10 | 8.13E−10 | 4.04 | 2.13 | 1.49 |
| 1.56E−09 | 3.01E−11 | 2.41E−10 | 8.13E−10 | 5.31 | 2.77 | 1.92 |
| 1.90E−09 | 3.01E−11 | 2.41E−10 | 8.13E−10 | 6.58 | 3.40 | 2.34 |
| 2.25E−09 | 3.01E−11 | 2.41E−10 | 8.13E−10 | 7.85 | 4.04 | 2.77 |

Experiments with the separator show that it is possible to separate vivianite and vivianite like structures from a flow with a magnetic separator. This separation is effectively possible due to the vivianite like structures being present relatively pure and as "free" particles. Non-optimised experiments already indicate that more than 60% (expressed as % of P bound in vivanite) of the vivianite and vivianite like structures can be separated. It will be understood that this separation would also be possible with an electromagnetic separator or gravity separator. The separation enables an effective removal and enabling an effective recovery of phosphate/phosphorus from a stream.

A further experiment using wet magnetic separation of vivianite was performed using the following protocol: the sludge is sieved (1 mm), providing a flowrate of 4-20 mL/min for 30 seconds, rinsing with water at 4-20 mL/min for 30 seconds, flushing the material with distilled water followed by vacuum drying. Different sludge types were used, for example Dutch, German and Finnish sludge. Optionally the material could be recirculated, for example to increase the purity. Results are shown in table 3 and 4.

TABLE 3

Percentage of phosphate present as vivianite or vivianite-like structures and percentage of dry weight made up of Volatile Solids (VS), for 3 different digested waste activated sludge's that differ in molar Fe:P ratio

| | NL | Ger | Fin |
|---|---|---|---|
| Initial VS (%) | 58.9 | 56.0 | 58.7 |
| Vivianite P (% of total P) | ~65 | ~80 | ~90 |
| Molar Fe:P | 1.1 | 1.57 | 2.36 |

TABLE 4

Percentage of the iron and phosphate in digested waste activated sludge that is recovered from the bulk sludge in a magnetic separator (e.g. FIG. 3), operated at different flow rates; the enrichment factor for iron and phosphate by magnetic separation; and the Volatile Solids percentage of the dry weight for the magnetically separated fraction

| | Flow Rate (mL/min) | Recovery efficiency (%) | | Enrichment factor | | Volatile solids as percentage of dry weight for magnetically separated fraction |
|---|---|---|---|---|---|---|
| | | Fe | P | Fe | P | |
| Dutch Sludge | 4 | 44.1 | 36.2 | 1.8 | 1.4 | 50.4 |
| | 8 | 49.2 | 40.4 | 3.4 | 2.8 | 31.1 |
| | 16 | 33.7 | 27.7 | 3.3 | 2.7 | 36.0 |
| | 20 | 17.0 | 13.3 | 2.5 | 2.0 | 42.3 |
| German Sludge | 4 | 75.3 | 67.8 | 1.3 | 1.2 | 63.1 |
| | 8 | 75.6 | 71.9 | 1.7 | 1.6 | 52.2 |
| | 16 | 47.7 | 43.7 | 2.2 | 2.0 | 46.2 |
| | 20 | 35.6 | 32.6 | 2.0 | 1.8 | 43.8 |
| Finnish Sludge | 4 | 98.3 | 112.5 | 1.3 | 1.4 | 59.8 |
| | 8 | 78.3 | 94.2 | 1.3 | 1.6 | 53.7 |
| | 16 | 54.2 | 61.8 | 1.9 | 2.1 | 44.3 |
| | 20 | 48.1 | 52.1 | 1.6 | 1.7 | 45.3 |

Results show that the concentration of the various materials which can be recovered does not limit the output. Low as well as high concentrations of iron and phosphor can be used.

Other metals can also be recovered. When flow rates are increased 52% to 62.2% vivianite is recovered. Results are shown in tables 5 and 6. Recovery of Fe and P is shown in Table 5.

TABLE 5

Concentrations of different elements in the magnetically separated fraction recovered from two different types of digested waste activated sludge and pure vivianite

| Separated fraction | Ca (g/kg TS) | Fe (g/kg TS) | K (g/kg TS) | Mg (g/kg TS) | Al (g/kg TS) | P (g/kg TS) | S (g/kg TS) |
|---|---|---|---|---|---|---|---|
| FIN-A | 26.7 | 120.3 | 10.8 | 4.0 | 6.1 | 28.4 | 8.6 |
| FIN-B | 17.1 | 236.2 | 2.0 | 2.8 | 4.6 | 64.6 | 6.0 |
| NL-A | 36.2 | 64.0 | 10.3 | 3.4 | 6.0 | 37.4 | 21.0 |
| NL-B | 20.0 | 195.2 | 1.8 | 7.5 | 4.6 | 77.2 | 9.6 |
| Pure vivianite | 9.5 | 308.0 | 0.0 | 10.8 | 0.0 | 119.0 | 0.8 |

TABLE 6

Composition of the magnetically separated fraction for two different digested waste activated sludges

| Sludge | Vivianite (as % of total TS) | FeCO$_3$ (as % of total TS) | Organic (as % of total TS) | Quartz (as % of total TS) | Total (as % of total TS) | Unknown (as % of total TS) |
|---|---|---|---|---|---|---|
| Finland | 52 | 3.33 | 21.2 | 7.81 | 84.34 | 15.66 |
| Netherlands | 62.6 | 0.26 | 21.9 | 7.32 | 92.08 | 7.92 |

A further experiment using different types of sludge, Dutch sludge sampled in Dokhaven and Finish sludge sampled in Espoo, were used to separate various components present in sludge. Different flow rates have been applied to both types of sludge. The iron (Fe) recovery for Dutch sludge was at 4 mL/min 38%, at 8 mL/min 44%, at 16 mL/min 45% and at 20 mL/min 39%. The phosphor (P) recovery for Dutch sludge was at 4 mL/min 32%, at 8 mL/min 38%, at 16 mL/min 36% and at 20 mL/min 31%. The iron (Fe) recovery for Finnish sludge was at 4 mL/min 53%, at 8 mL/min 49%, at 16 mL/min 31% and at 20 mL/min 31%. The phosphor (P) recovery for Finnish sludge was at 4 mL/min 53%, at 8 mL/min 51%, at 16 mL/min 39% and at 20 mL/min 37%.

The enrichment increases with the flow rate for both type of sludge and elements. The separation becomes more selective with the increase of the flow rate. Higher streams reduce the part of non and/or less magnetic material susceptible to be retained.

An even further experiment using different types of sludge showed that during the magnetic separation the organic content decreases of around half which is corroborated by the reduction of the amorphous bump. Thus, vivianite can be recovered from the sludge by magnetic separation.

Furthermore, the experiments show the effect of the molar Fe:P ratio on the efficiency of the removal/recovery of phosphate from the stream. Furthermore, the experiments show that an effective recovery is possible by effective separation of the vivianite like structures from the stream.

Further separation experiments using a bench-scale vertically pulsating high gradient magnetic separator (VPHGMS) were performed. This separator utilizes a matrix of steel rods with 1 mm diameter placed in a magnetic field of 1 Tesla created by electromagnetic coils. A steady water flow of 4 L/min is created over the matrix and a vertical pulsation is created in the water flow with a frequency of 20 Hz. A 500 gram sludge sample is fed batch wise to the water flow and is consequently carried over the matrix together with the water. Magnetic particles are retained on the matrix while the non-magnetic particles are flushed out of the machine with the water flow. Once the water flow coming out of the machine is clear by sight and no non-magnetic solids are coming out, the flow is stopped, the magnetic field is switched off and the magnetic fraction is then flushed from the matrix and captured. This magnetic fraction is called the concentrate.

The result of the separation experiment is shown in Table 7.

TABLE 7

Result of VPHGMS separation test.

| Feed sample | Dry solids content | Concentrate dry mass yield | Recovery Fe | Recovery P | Feed content Fe | Feed content P | Concentrate content Fe | Concentrate content P |
|---|---|---|---|---|---|---|---|---|
| Finnish sludge | 2.66% | 16.0% | 49.0% | 56.6% | 12.0% | 3.0% | 36.8% | 10.7% |

The results show that 57% of the phosphorus is recovered from the feed sludge. The elemental phosphorus content of the concentrate is 10.7%

The concentrate was studied with a scanning electron microscope (SEM) combined with energy-dispersive x-ray spectroscopy (EDX). The SEM-EDX results indicate that the concentrate is homogeneous in composition and mostly comprise vivianite (FIG. 7, wherein needle-like crystal structures which are typical for vivianite were observed).

Pure vivianite has an elemental phosphorus content of 12.35%. If we assume that all the phosphorus in the concentrate is bound to vivianite as indicated by SEM-EDX, the vivianite content of the concentrate is 86.6%

The present invention is by no means limited to the above described preferred embodiments thereof. The rights sought are described by the following claims, within the scope of which many modifications can be envisaged.

The invention claimed is:

1. A method for phosphate recovery from a stream such as waste flow, sewage or another sludge stream, the method comprising the steps of:
   providing an incoming stream comprising an initial amount of phosphate;
   dosing and controlling iron salt to the stream such that precipitates are formed in the stream, wherein the precipitates comprise vivianite like structures comprising more than 60% by weight of the initial amount of phosphate in the incoming stream; and
   separating the vivianite like structures from the stream,
   wherein separating the vivianite like structures from the stream comprises magnetic separation of the structures with a magnetic and/or electromagnetic separator.

2. The method according to claim 1, wherein the vivianite like structures comprise more than 70% by weight of the initial amount of phosphate in the incoming stream.

3. The method according to claim 1, wherein the iron salts comprise one or more of iron chloride and iron sulphate.

4. The method according to claim 1, wherein dosing iron salt comprises adding an amount of iron with a molar ratio iron:phosphorus of at least 1.25.

5. The method according to claim 1, further comprising the step of controlling the dosing of iron salt in response to a measurement of the initial amount of phosphate in the incoming stream.

6. The method according to claim 1, wherein separating the vivianite like structures from the stream comprises separating the structures with a gravity separator.

7. The method according to claim 1, wherein the step of recovering the phosphates comprises treating the vivianite like structures to produce iron oxide precipitates.

8. The method according to claim 7, wherein treating the vivianite like structures comprises performing an alkaline treatment to produce a potassium phosphate solution.

9. The method according to claim 7, further comprising the step of treating the iron oxide with hydrochloric acid to produce iron chloride.

10. The method according to claim 9, further comprising the step of recycling the iron chloride in the step of dosing iron salt.

11. The method according to claim 1, wherein the stream is a flow to an anaerobic treatment system.

12. The method according to claim 1, wherein the stream comprises of waste flow and/or sewage sludge and/or industrial sludge and/or any other type of sludge.

13. The method according to claim 1, wherein the pH of the stream is in the range of 6-10.

14. The method according to claim 1, wherein the stream is a flow to a digester.

15. A method for phosphate recovery from a stream such as waste flow, sewage or another sludge stream, the method comprising the steps of:
   providing an incoming stream comprising an initial amount of phosphate;
   dosing and controlling iron salt to the stream such that precipitates are formed in the stream, wherein the precipitates comprise vivianite like structures comprising more than 60% by weight of the initial amount of phosphate in the incoming stream;
   separating the vivianite like structures from the stream,
   wherein separating the vivianite like structures from the stream comprises magnetic separation of the structures with a magnetic and/or electromagnetic separator.

16. The method according to claim 15, wherein the step of recovering the phosphates comprises treating the vivianite like structures to produce iron oxide precipitates, and wherein treating the vivianite like structures comprises performing an alkaline treatment to produce a potassium phosphate solution, and wherein the pH of the stream is in the range of 6-10.

17. The method according to claim 13, wherein the pH of the stream is in the range of 7-10.

18. The method according to claim 17, wherein the pH of the stream is in the range of 7-9.

19. The method according to claim 18, wherein the pH of the stream is in the range of 7-8.

* * * * *